United States Patent [19]

Miyajima

[11] Patent Number: 5,539,477
[45] Date of Patent: Jul. 23, 1996

[54] VIDEO-SIGNAL TRANSMITTER-RECEIVER AND A SIGNAL TRANSMISSION APPARATUS UTILIZING THE SAME

[75] Inventor: Akio Miyajima, Neyagawa, Japan

[73] Assignee: Matsushita Electric Industrial Co., Ltd., Osaka, Japan

[21] Appl. No.: 365,199

[22] Filed: Dec. 28, 1994

[30] Foreign Application Priority Data

Dec. 28, 1993 [JP] Japan .................................. 5-335829

[51] Int. Cl.$^6$ .................................................. H04N 5/63
[52] U.S. Cl. ........................ 348/730; 348/484; 348/724; 348/726; 348/738
[58] Field of Search ...................... 348/571, 730, 348/476, 482, 484, 525, 708, 723, 724, 725, 726, 738; 358/190; 455/38.3, 343, 127; H04N 5/63

[56] References Cited

U.S. PATENT DOCUMENTS 4,857,917 8/1989 Sato .......................... 455/343

FOREIGN PATENT DOCUMENTS 55161475 12/1980 Japan .

OTHER PUBLICATIONS

Von Manfred Gendsior et al., "Signale auf der Glasfaser", FUNKSCHAU, vol. 62, No. 1, pp. 51–55, Dec. 1989.
European Search Report dated Apr. 10, 1995.

Primary Examiner—Safet Metjahic
Assistant Examiner—Sherrie Hsia
Attorney, Agent, or Firm—Ratner & Prestia

[57] ABSTRACT

A signal transmitter and receiver (or a combination thereof) incorporated for example in audio and video apparatus such as a TV and a video-deck, comprises a synchronizing signal separator separating a synchronizing signal from video-signal, a monostable circuit of which period recovering its stable state, or unstable period, after an input of triggering signal, is longer than the period of synchronizing signal separated by the synchronizing signal separator, and a dc-power supply on-off controller controlling the on-off of dc-power supply according to the output of the monostable circuit. The dc-power supply on-off controller limits the supply of dc-power to a minimal number of circuits except during signal processing.

10 Claims, 4 Drawing Sheets

VIDEO-SIGNAL TRANSMITTER-RECEIVER AND A SIGNAL TRANSMISSION APPARATUS UTILIZING THE SAME

BACKGROUND OF THE INVENTION

The present invention relates to a video signal transmitter and a video signal receiver which may be incorporated, for example, into audio/video (AV) apparatus.

FIG. 4 shows an AV signal transmitter in accordance with the prior art, wherein a dc power-supply (not shown) is connected to dc-power supply input-terminal 54, video-signal 52 is received by video-signal input-terminal 55, and audio-signal 53 is received by audio-signal input-terminal 56.

The video-signal 52 received by video-signal input-terminal 55 is received further by video-signal modulator 57 for modulation, and the signal modulated thereby is then received by electro-optical converter 58 wherein the electrical signal is converted into an optical-signal. Video-signal modulator 57 and electro-optical converter 58 may be defined as video-signal transmitter 38.

On the other hand the audio-signal 53 received by audio-signal input-terminal 56 is received further by audio-signal modulator 39 wherein the audio-signal is modulated. After this, the signal is received by electro-optical converter 40 wherein the electrical signal is converted into an optical signal. Audio-signal modulator 39 and electro-optical converter 40 constitute audio-signal transmitter 41.

The optical signal transmitted from video-signal transmitter 38 is inputted into opto-electrical convertor 42 and is converted into electrical signal which are demodulated by means of video-signal demodulator 43.

Opto-electrical converter 42 and video-signal demodulator 43 may be defined as video-signal receiver 44.

The signal received by video-signal receiver 44 is outputted from video-signal output-terminal 50 through video-signal output-buffer 45.

On the other hand, the audio optical-signal is converted into an electrical signal by means of opto-electrical converter 46, and the electrical signal is demodulated by means of audio-signal demodulator 47. Opto-electrical converter 46 and audio-signal demodulator 47 may be defined as audio-signal receiver 48.

The audio-signal received by audio-signal receiver 48 is outputted from audio-signal output-terminal through audio-signal output-buffer 49.

In a transmit mode, dc-power is supplied to dc-power input-terminal 54, video-signal 52 received by video-signal input terminal 55 is modulated by means of video-signal modulator 57, and the modulated electrical signal is converted into an optical signal by means of electro-optical converter 58.

On the other hand, dc-power is supplied to dc-power input-terminal 54, the optical signal is converted into an electrical signal by means of opto-electrical converter 42, the electrical signal is demodulated into original video signal 52 by means of video-signal demodulator 43, and original video-signal 52 is outputted from video-signal output-terminal 50 through video-signal output buffer 45.

Likewise, for the audio-signal, dc-power is supplied to dc-power input terminal 54, audio-signal 53 received by audio-signal input terminal 56 is modulated by means of audio-signal modulator 39, and the modulated electrical signal is converted into an optical signal by means of electro-optical converter 40.

At the receiver, the optical-signal is converted into an electrical signal by means of opto-electrical converter 46, the electrical signal is demodulated into original audio-signal 53 by means of audio-signal demodulator 47, and the original audio-signal 53 is outputted from audio-signal output-terminal 51 through audio-signal output-buffer 49.

As explained above, in a conventional signal transmitter, video-signal 52 received by video-signal input-terminal 55 when dc-power is supplied to dc-power input-terminal 54, is demodulated into original video-signal 52, and this is outputted from video-signal output-terminal 50.

Likewise, audio-signal 53 inputted into audio-signal input terminal 56 is converted into original audio-signal 53 which is outputted from audio-signal output-terminal 51.

SUMMARY OF THE INVENTION

However, since this signal transmission apparatus consists of a conventional video-signal transmitter, audio-signal transmitter, video-signal receiver, and audio-signal receiver, and a video signal detecting function is not included, the power-consumption of this apparatus remains same regardless of the input or non-input of video-signal, constituting a problem.

The present invention relates to a signal-transmission apparatus comprising a synchronizing signal separator for separating synchronizing signals from inputted video-signals, a monostable circuit with a recovery period (or unstable period) after a triggering signal input is longer than the period of the synchronizing signal separated by the synchronizing signal separator, a dc-power supply controller controlling the supply of dc-power (i.e. to prevent or reduce the supply of power) to the apparatus according to the output of the monostable circuit, a video-signal modulator modulating the inputted video-signal, and a transmitter transmitting the output of the video-signal modulator, wherein the power-consumption of the apparatus is reduced at its lowest level by using the synchronizing signal separated by the synchronizing signal separator as a triggering signal of the monostable circuit.

Moreover, the signal transmission apparatus is further provided with a video-signal receiver into which an input signal containing a video-signal is inputted, a video-signal demodulator by which the video-signal received at the video-signal receiver is demodulated, a synchronizing signal separator by which the synchronizing signal of the video signal is demodulated by means of the synchronizing signal demodulator, a monostable circuit having an unstable period which is longer than the period of the synchronizing signal which is separated by the synchronizing signal separator, and a dc-power supply on-off controller controlling the supply of dc-power according to the output of the monostable circuit.

Thus, when the video-signal transmission apparatus is combined with a video-signal receiver utilizing the synchronizing signal separated by means of the synchronizing signal separator as a triggering signal of the monostable circuit, a signal transmission apparatus with reduced power consumption at its minimum level can be obtained.

Furthermore, additional advantages are obtained where the input-signal is a complex signal or a multiplex signal containing a signal other than the video-signal such as a audio-signal.

In other words, the power consumption of the signal transmission apparatus can be further reduced to its minimum level when a transmitter in which an input signal containing at least a video-signal is processed, is combined with a receiver provided with a synchronizing signal detector is combined with a dc-power supply on-off controller.

Therefore, the signal transmission apparatus comprises a transmitter into which a signal containing at least a video signal is received, a receiver having a synchronizing signal separator separating a synchronizing signal from the video signal, a monostable circuit having a recovery period to a stable state from an unstable period after the input of the triggering signal is longer than the period of synchronizing signal separated by the synchronizing signal separator, and a dc-power supply on-off controller controlling the supply of dc-power according to the output of the monostable circuit.

Since the synchronizing signal separated by the synchronizing signal separator is used as a triggering signal for the monostable circuit, the monostable circuit remains in an unstable state as long as the synchronizing signal is inputted into the monostable circuit as a triggering signal.

In general, a monostable circuit can be in either one of two states, i.e., stable state or unstable state. Thus, when a triggering signal is received by the monostable circuit which is normally in a stable state, the circuit is shifted toward its-unstable state and remains there for a period determined by the constants of the monostable circuit, and the state of the circuit recovers to its stable state after a certain period has passed.

Thus, an output of a predetermined pulse width can be obtained by utilizing this switching action. Defining a period in which the circuit is in a unstable state as an unstable period, and by making the unstable period last longer than the period of the synchronizing signal outputted from the synchronizing signal separator, it is possible to realize the following operations.

When a first synchronizing signal is inputted into the monostable circuit which is in a stable state as a triggering signal, the circuit state is reversed into an unstable state. However, when a next synchronizing signal is inputted into the monostable circuit before the circuit regains its stable state after a certain period, the circuit remains in an unstable state.

As for the video-signal having a certain form is inputted into the synchronizing signal separator, the synchronizing signal outputted from the synchronizing signal separator keeps the monostable circuit in an unstable state, and this period of holding the monostable circuit in an unstable state corresponds to a period during which the video-signal is applied.

Thus, by setting the period holding this unstable state as a dc-power supply control signal and by inputting the control signal into the dc-power supply on-off controller, it is possible to control the dc-power supply according to the input of video-signal.

As described above, the dc-power supplied to the transmitter and receiver (other than the video-signal detecting circuit) can be suspended. Therefore, a substantial reduction of power consumption at the transmitter, receiver, or the signal transmission apparatus as a whole can be realized.

DESCRIPTION OF THE PREFERRED EMBODIMENTS

An exemplary embodiment of the present invention is now explained below with reference to FIG. 1 and FIGS. 2(a)–2(d).

Figure 1:
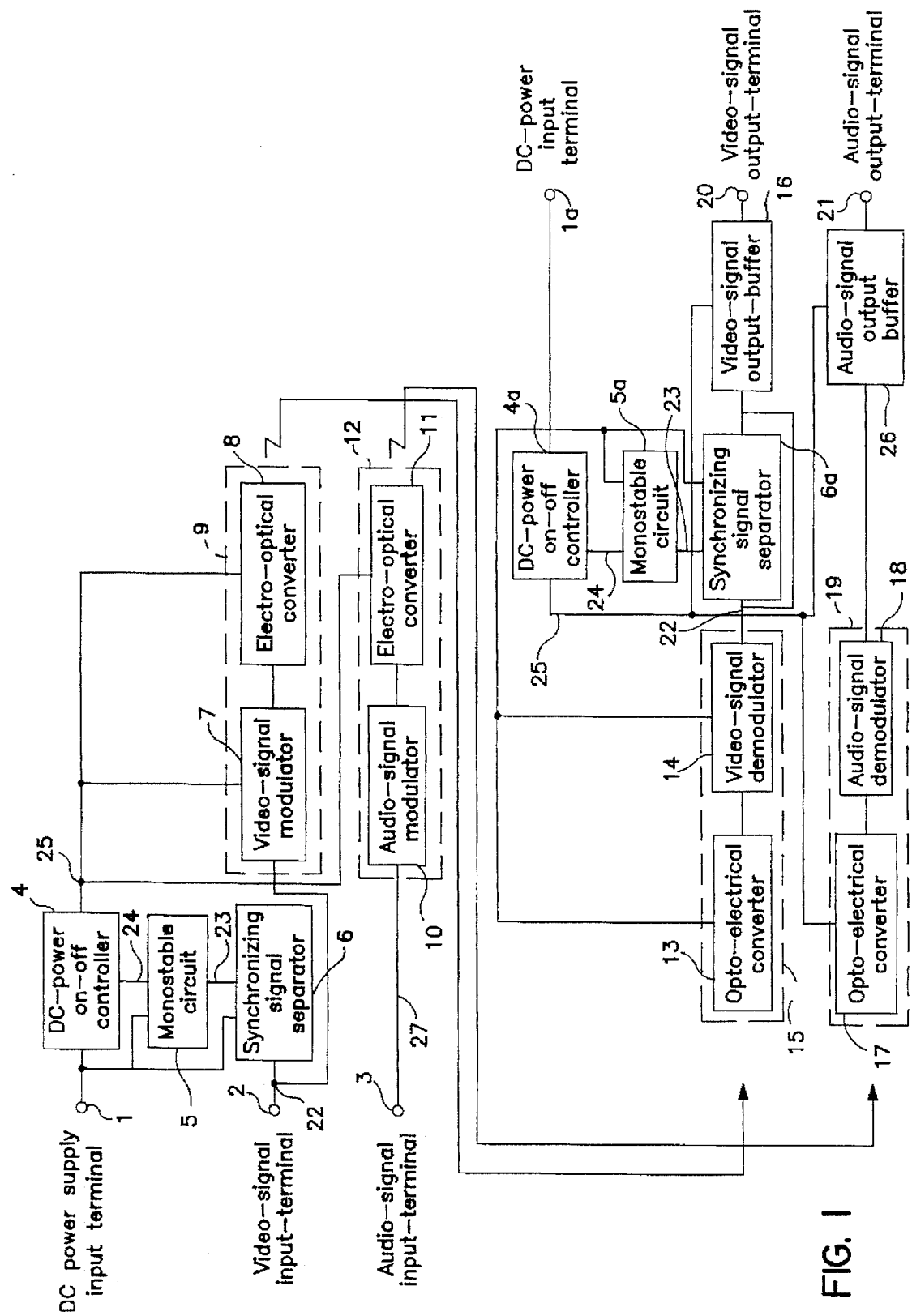
FIG. 1 shows a block diagram of a signal transmission apparatus in accordance with an exemplary embodiment of the present invention.

According to FIG. 1, the receiver of the signal transmission apparatus is provided with three terminals, i.e., dc-power supply input-terminal 1, video-signal input-terminal 2, and voice-signal input-terminal 3. The dc-power supply input-terminal 1 is connected to dc-power supply on-off controller 4, monostable circuit 5, and synchronizing signal separator 6. The video-signal input-terminal 2 is connected to synchronizing signal separator 6, while the output of synchronizing signal separator 6 is connected to dc-power supply on-off controller 4 through monostable circuit 5.

Furthermore, video-signal input-terminal 2 is connected to video-signal modulator 7, audio-signal input-terminal 3 is connected to audio-signal modulator 10, and the output of video-signal modulator 7 is connected to electro-optical converter 8, thus constituting video-signal transmitter 9 together with video-signal modulator 7.

The output of audio-signal modulator 10 is connected to electro-optical converter 11, constituting audio-signal transmitter 12 together with audio-signal modulator 10. Moreover, the output of dc-power supply on-off controller 4 is connected to video-signal modulator 7, electro-optical converter 8, audio-signal modulator 10, and electro-optical converter 11.

On the other hand, the receiver provided with dc-power supply input-terminal 1a is connected to dc-power supply on-off controller 4a, monostable circuit 5a, and synchronizing signal separator 6a. The opto-electrical converter 13 receiving the optical video-signal from the transmitter is connected to video-signal demodulator 14, constituting video-signal receiver 15 together with opto-electrical converter 13 and video-signal demodulator 14. The opto-electrical converter 17 receiving the optical audio-signal from the transmitter is connected to audio-signal demodulator 18, constituting audio-signal receiver 19 together with opto-electrical converter 17 and audio-signal demodulator 18.

The output of video-signal receiver 15 is connected to synchronizing signal separator 6a and video-signal output buffer 16 so that the reproduced output is outputted from video-signal output-terminal 20 of video-signal output buffer 16. The output of synchronizing signal separator 6a is connected to dc-power supply on-off controller 4a through monostable circuit 5a, and the output of audio-signal receiver 19, which is the reproduced signal is outputted from audio-signal output-terminal 21 through audio-signal output buffer 26.

The output of dc-power supply on-off controller 4a is connected to audio-signal receiver 19, video-signal output buffer 16, and audio-signal output buffer 26, while opto-electrical converter 13 of video-signal receiver 15 and video-signal demodulator 14 are connected directly to dc-power supply input-terminal 1a.

As explained above, the signal transmission apparatus consists of a transmitter and a receiver. The timing charts showing signal exchange there-between are shown in FIGS. 2(a) to 2(d). In these timing charts, 31 is a time at which the input of video-signal 22 from either video-signal input-terminal or video-signal demodulator is begun, and 32 is a time at which the input of video-signal 22 ends. 23 is synchronizing signal 23 outputted from synchronizing signal separator 6 or 6a, and 24 is a signal outputted from monostable circuit 5 or 5a.

While the synchronizing pulse of synchronizing signal 23 is inputted into monostable circuit 5 or 5a as its triggering pulse in order to bring monostable circuit into an unstable state, 28 is a monostable pulse width, and this corresponds to the period of the unstable state. This period is desirable to recover the stable state of monostable circuit 5 from its unstable state after a last synchronizing pulse is inputted, or from the time at which the synchronizing pulse starts to fall.

29 is a time at which the output signal 24 of monostable circuit 5 or 5a falls to 0 volts. This corresponds to the unstable state from the stable state which corresponds to 5 volts.

25 relates to operation of dc-power supply on-off controller 4 or 4a according to output-signal 24, showing a change of the dc power supply voltage.

Explaining the operation of the embodiment of FIG. 1, the input of video-signal 22 into the receiver is commenced at time 31 when the input of the video-signal is started regardless of the type of video-signal (either digital or analog), and the input of the video-signal is terminated at time 32 when the input of the video-signal is terminated, as shown in FIG. 2. The synchronizing signal 23 is separated by synchronizing signal separator 6 between the start and termination of the input of the video-signal.

In addition, an operation by which synchronizing signal 23 is separated from the video-signal by synchronizing signal separator 6, an operation by which the synchronizing signal is separated from a so-called composite signal in which luminance signal, chrominance signal, and synchronizing signal are combined, an operation by which the synchronizing signal is separated from a so-called S-video-signal in which the luminance and the chrominance signals had been separated, an operation by which the synchronizing signal is separated from RGfl signal, and an operation by which the signal corresponding to the synchronizing signal is separated from the digital video signal in a unit of either frame, field or block may be used.

If monostable pulse width 28 (corresponding to an unstable period of the monostable circuit) is set to a period of time of more than 20 ms, the period corresponding to the vertical synchronizing signals of NTSC, PAL, or SECOM could take a value of 16.6, 20, or 20 ms respectively.

Thus, the triggering signal would be received at an interval of less than 20 ms, which is the pulse width of the monostable circuit.

Since this is independent of the types of input video signals, i.e., NTSC, PAL or SECOM, the monostable circuit output signal 24 is held at 0 volts during the period of the synchronizing signal (the period between time 29 when the output signal of the monostable circuit takes a value of 0 volt and time 30 when the output signal takes a value of 5 volts.

Figure 2A:
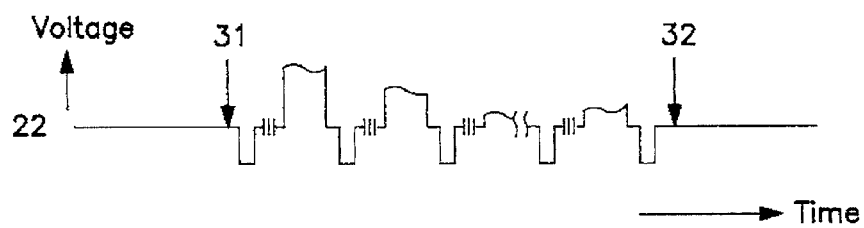
FIGS. 2(a)–2(d) illustrate signal waveforms obtained internally from the signal transmission apparatus of FIG. 1.
Figure 2B:
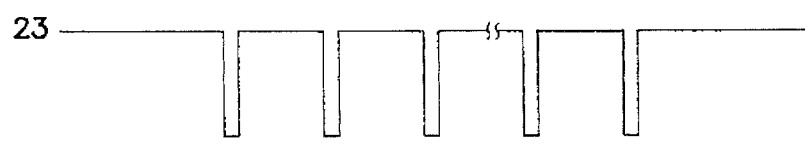
Figure 2C:
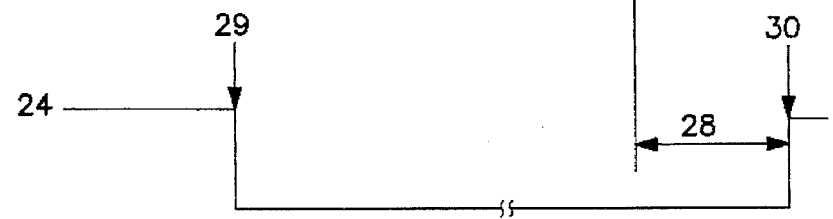
Figure 2D:

Therefore, as shown in FIG. 2(d), the dc-power supply voltage 25 is held at 5 volts from time 29 when the output signal 24 of monostable circuit 5 is held at 0 volts to time 30 when the output signal takes a value of 5 volts.

Thus, dc-power is supplied to the circuits when the video-signal is inputted, and dc-power is cut off otherwise.

Thus, the power consumption in video-signal transmitter 9 and audio-signal transmitter 12 to which the dc-power is supplied through dc-power supply on-off controller 4 is reduced to a minimum level.

Likewise, when a signal is received at video-signal receiver 15 and video signal 22 is supplied to synchronizing signal separator 6a, dc-power is supplied to all of the receiver circuits.

However, to each of the receiver sections including video-signal output buffer 16, audio-signal receiver 19, and audio-signal output buffer 26 shown in FIG. 2, dc-power is supplied through dc-power on-off controller 4a only when required, and is cut off otherwise so that the dc-power consumed in these sections can be kept to a minimum level.

In other words, the dc-power supply is controlled so that the entire circuit is put into operation only when the video-signal is processed, and only the circuit by which the input of video-signal is detected is put into operation otherwise. Thus, the power consumption can be reduced to its minimum, so that a substantial reduction of power consumption in the entire AV transmission apparatus can be realized.

Furthermore, as long as video-signal 22 is received by the receiver, dc-power supply on-off controller 4 is maintained in an on-state. Thus, the video-signal 22 inputted from video-signal input-terminal 2 is modulated at video-signal modulator 7, the modulated electrical signal is converted into an optical signal by electro-optical convertor 8, the converted electrical signal is demodulated into a video-signal by video-signal demodulator 14, and the original video-signal 22 is outputted from video-signal output-terminal 20 through video-signal output buffer 16.

Likewise, when audio-signal 27 is received at audio-signal input-terminal 3 of transmitter, audio-signal 27 is modulated by audio-signal modulator 10, and the modulated electrical signal is converted into an optical signal by means of electro-optical converter 11. The optical signal is then converted into an electrical signal by opto-electrical converter 17 of the receiver, and the electrical signal is demodulated into the original audio-signal by audio-signal demodulator 18, and the original audio-signal 27 is outputted from audio-signal output terminal 21 through audio-signal output buffer 26.

According to the above described exemplary embodiment of the invention, since the dc-power supply is cut off (or reduced) by dc-power supply on-off controller 4 when no video-signal is inputted, the total dc-power consumed in the video-signal transmitter 9, audio-signal transmitter 12, video-signal output buffer 16, audio-signal receiver 19, and audio-signal output buffer 26, becomes zero (or less then typical). Thus, total power consumption of the AV transmission apparatus when no video-signal 22 is inputted, can be reduced to its minimum level.

Furthermore, when the present invention is applied to a transmitter and receiver in which a multiplex signal containing other signals (such as audio signals) besides a video-signal is processed, detection of the video-signal can be used to detect the multiplex-signal (regardless of whether the multiplex signal is an analog signal or digital signal). Thus, since the various signals may include multiplexed signals, the multiplexed signals can be detected by only detecting the video-signal. Thus, the control of dc-power supplies connected to a complicated circuit by which various multiplexed signals are processed is possible, and the power consumption of this total system can be effectively reduced also.

Figure 3:
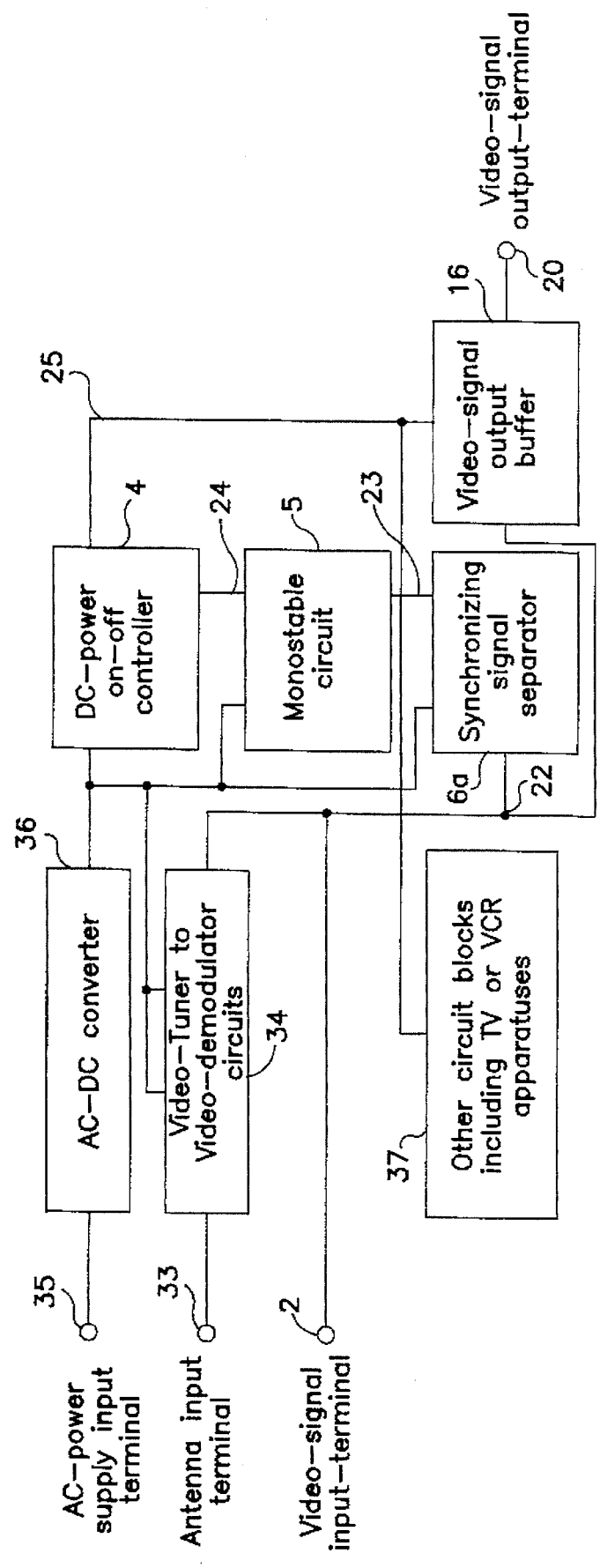
FIG. 3 shows a block diagram of a receiver circuit in accordance with another exemplary embodiment of the present invention.
Figure 4:
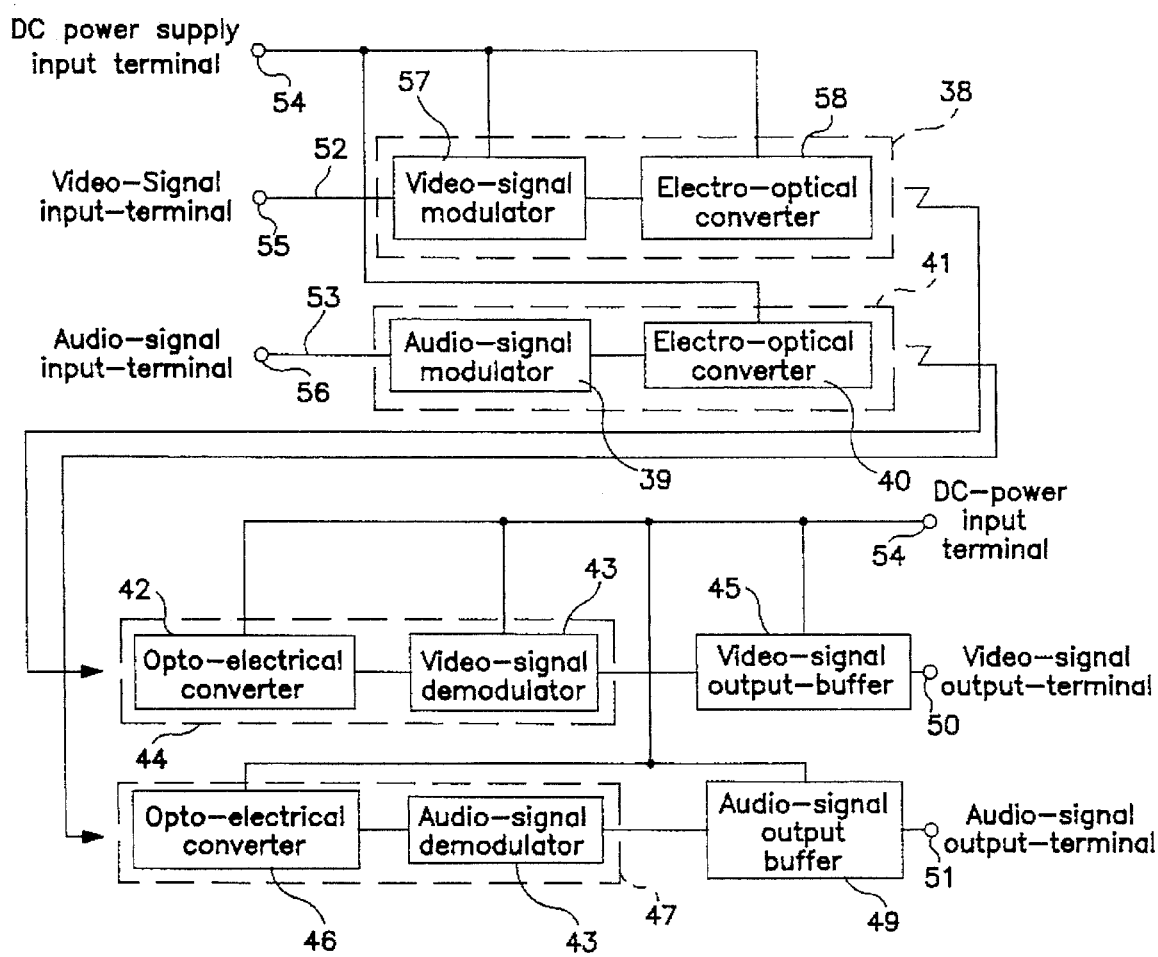
FIG. 4 shows a block diagram of conventional signal transmission apparatus in accordance with the prior art.

FIG. 3 shows a block diagram of another exemplary embodiment of the invention, wherein 33 is an antenna input-terminal, 34 is a tuner, 35 is an ac-power input-terminal, 36 is an ac-to-dc converter and 37 is another circuit block of video apparatus such as TV and VCR.

This embodiment differs from the embodiments shown in FIGS. 1 and 2, in that, ac-power inputted into ac-power input-terminal 35 is converted into dc-power which is supplied to circuits 34 (including a video signal tuner to video-signal demodulator), synchronizing signal separator 6b, monostable circuit 5, and dc-power supply on-off controller 4.

As in the explanations described for the embodiments shown in FIGS. 1 and 2, the power supply to these circuits is cut off by dc-power supply on-off controller 4 when video-signal 22 (transmitted through circuits 34 which includes the video-signal tuner to video-signal demodulator) becomes unavailable due to the ending of daily broadcasting (for example). Therefore, the power consumption in video-signal output buffer 16 and other circuit blocks 37 in which video signals for TV or VCR are processed can be decreased. Thus, in this exemplary embodiment, the power consumption in these apparatuses other than the video-signal detecting block can be nullified when no video-signal is inputted therein.

According to the present invention (for example, the embodiment of FIG. 3), no dc-power is supplied to at least the video-signal transmitter or receiver as long as no video-signal is inputted. Therefore, by using this invention, the power consumption in the signal transmission apparatus can be set to its minimum level as long as no video-signal is inputted therein. Furthermore, the savable power consumption in the signal transmission apparatus in total is higher when more of the transmittable signals, other than the video-signal, are processed therein.

What is claimed:

1. A video-signal transmission apparatus comprising:

video-signal input-means for receiving a video-signal, synchronizing signal separator means for extracting a synchronizing signal from the video-signal, said synchronizing signal having a period, a circuit having an output signal which transitions from a first state to a second state responsive to a triggering signal, said second state maintained for a time period longer than the period of said synchronizing signal, dc-power supply controller means for preventing or reducing a supply of dc-power from a dc-power supply responsive to the output signal of said circuit being in said second state, video-signal modulator means coupled to the output of said dc-power supply controller means for modulating said video-signal to generate a modulated video-signal, and transmitter means coupled to the output of said dc-power supply controller means for transmitting said modulated video-signal, wherein said synchronizing signal is said triggering signal of said circuit.

2. A video-signal transmission apparatus according to claim 1, wherein said dc-power supply controller means selectively enables the supply of dc-power to at least one of said video-signal modulator means and said transmitter means.

3. A video-signal transmission apparatus according to claim 1, further comprising an audio-signal input-terminal, an audio-signal modulator by which an audio-signal inputted from said audio-signal input-terminal is modulated, and an audio-signal transmitter transmitting an output of said audio-signal modulator, wherein said dc-power supply controller means selectively enables the supply of dc-power to at least one of said audio-signal modulator and said audio-signal transmitter.

4. A video-signal receiver comprising:

input signal means for receiving a video-signal, video-signal demodulator means for demodulating said video-signal to generate a demodulated video-signal, synchronizing signal separator means for extracting a synchronizing signal from said demodulated video-signal, said synchronizing signal having a period, a circuit having an output signal which transitions from a first state to a second state responsive to a triggering signal, said second state maintained for a time period longer than the period of said synchronizing signal, dc-power supply controller means for preventing or reducing a supply of dc-power from a dc-power supply responsive to the output signal of said circuit being in said second state, and signal processing means coupled to said dc-power supply controller means, wherein said synchronizing signal is said triggering signal of said circuit.

5. A video-signal receiver according to claim 4, wherein said signal processing means comprises a video-signal output buffer for storing an output of said video-signal demodulator means, said video-signal output buffer powered by said dc-power supply, and wherein responsive to detection of absence of the video-signal being received at said video-signal receiver, power provided by said dc-power supply controller means to said video-signal output buffer is reduced.

6. A video-signal receiver according to claim 4 wherein said signal processing means comprises one of a television receiver and a video-deck.

7. A video-signal receiver according to claim 4, wherein said signal processing means comprises an audio-signal receiver and an audio-signal demodulator for demodulating an audio-signal received at said audio-signal receiver, wherein the dc-power is supplied to said audio-signal receiver and said audio-signal demodulator through said dc-power supply controller means.

8. A signal transmission apparatus comprising:

transmitter means for transmitting a video-signal, first synchronizing signal separator means for separating a first synchronizing signal from said video-signal, a first circuit, a first dc-power supply controller for controlling or reducing a supply of dc-power from a dc-power supply, receiver means for receiving the video-signal transmitted by said transmitter means, a video-signal output buffer for storing the video-signal received by said receiver means, second synchronizing signal separator means for separating a second synchronizing signal from said received video-signal, a second circuit, and a second dc-power supply controller for controlling or reducing the supply of dc-power from one of said dc-power supply and a further dc-power supply, wherein said first and second circuits each respectively signals said first and second dc-power supply controllers to one of prevent and reduce the dc-power to said signal transmitter and signal receiver respectively responsive to said first and second synchronizing signals.

9. A signal transmission apparatus according to claim 8, wherein said first dc-power supply controller is responsive to said video-signal and said second dc-power supply controller is responsive to said received video signal.

10. A signal transmission apparatus comprising:

a video-signal input terminal for receiving a video-signal, first synchronizing signal separator means for separating a first synchronizing signal from said video-signal, a first circuit which provides an output signal which transitions from a first state to a second state responsive to a triggering signal, said second state maintained for a time period longer than the period of said first synchronizing signal, first dc-power supply controller means for one of preventing and reducing a supply of dc-power from a dc-power supply responsive to said output signal of said first circuit, video-signal modulator means coupled to said first dc-power supply controller means for modulating the video-signal to generate a modulated video signal, transmitter means coupled to said dc-power supply controller means for transmitting the modulated video-signal, receiver means for receiving said video-signal transmitted by said transmitter means, video-signal demodulator means for demodulating said received video-signal to generate a demodulated video-signal, second synchronizing signal separator means for separating a second synchronizing signal from said demodulated video-signal, a second circuit which provides a further output signal which transitions from a further first state to a further second state responsive to a further triggering signal, said further second state maintained for a time period longer than the period of said second synchronizing signal, second dc-power supply controller means for one of preventing and reducing the supply of dc-power from one of said dc-power supply and a further dc-power supply responsive to said further output signal of said second circuit, and signal processing means coupled to said second dc-power supply controller means, wherein said first and second synchronizing signals are used as respective triggering signals of said first and second circuits.

* * * * *